United States Patent [19]

Iwata et al.

[11] Patent Number: 5,009,460
[45] Date of Patent: Apr. 23, 1991

[54] WINDOW MOLDING MEMBER FOR AUTOMOBILES

[75] Inventors: Takao Iwata; Tetsuo Hotta, both of Yokohama, Japan

[73] Assignee: Hashimoto Forming Industry Co., Ltd., Japan

[21] Appl. No.: 426,779

[22] Filed: Oct. 26, 1989

[30] Foreign Application Priority Data

Oct. 31, 1988 [JP] Japan ............................ 63-142492[U]

[51] Int. Cl.⁵ ............................ B60J 10/02; B60J 1/20
[52] U.S. Cl. .................................... 296/93; 296/208
[58] Field of Search ........................ 296/93, 208, 213

[56] References Cited

U.S. PATENT DOCUMENTS

| | | | |
|---|---|---|---|
| 4,278,286 | 7/1981 | Kiba et al. | 296/93 |
| 4,332,412 | 6/1982 | Nakazawa et al. | 296/93 X |
| 4,389,069 | 6/1983 | Sengoku | 296/93 X |

FOREIGN PATENT DOCUMENTS 3210106 10/1983 Fed. Rep. of Germany ...... 296/208
54416 11/1982 Japan .
178422 8/1987 Japan .................................... 296/93
283017 12/1987 Japan .

Primary Examiner—Margaret A. Focarino
Assistant Examiner—Andrew C. Pike
Attorney, Agent, or Firm—Stevens, Davis, Miller & Mosher

[57] ABSTRACT

A window molding member for automobiles includes at least one upper segment and at least one side segment to extend along upper and side edges of a window plate, respectively, which are integrally and continuously connected with each other. The molding member comprises a main body having a section with a longitudinally variable width, which is engageable with the outer surface of the window plate with a cushion element therebetween. The cushion element may have a longitudinally variable thickness to form a weir along the side segment for preventing rain water on the window plate from flowing across the side segment to preserve driver's sight through a side window.

5 Claims, 5 Drawing Sheets

FIG_1
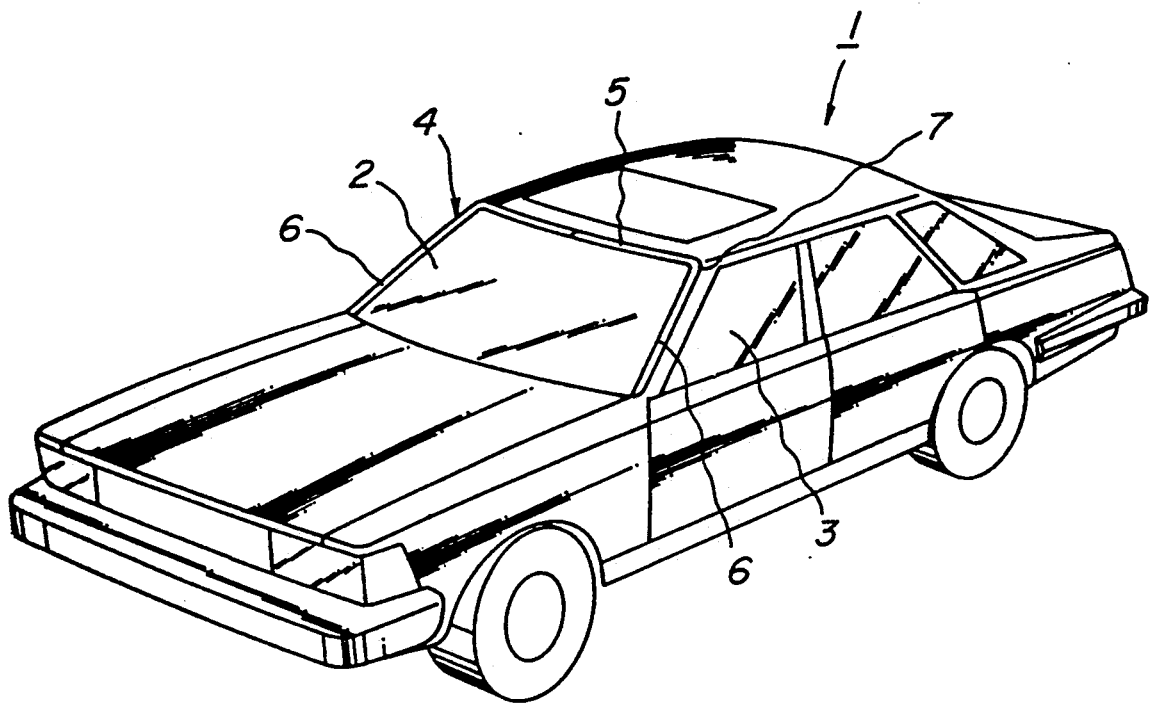

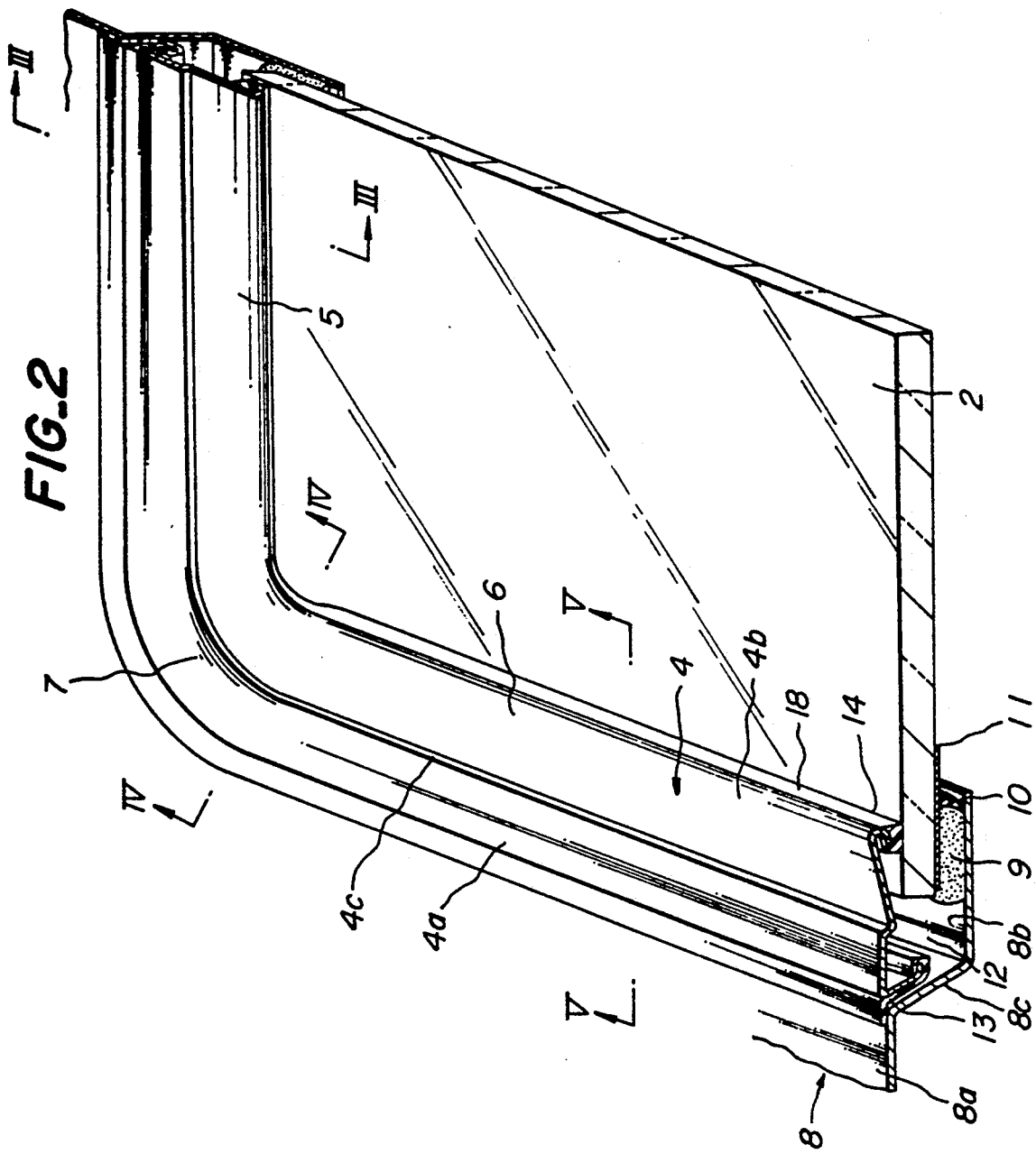

FIG._3
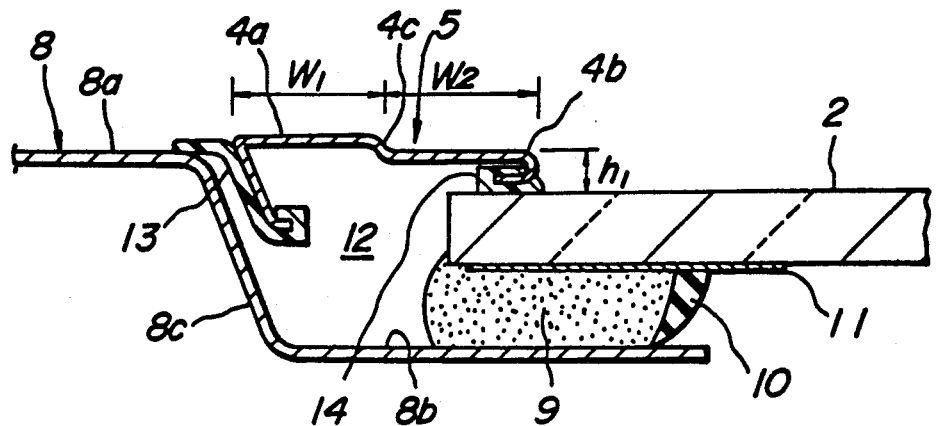
FIG._4
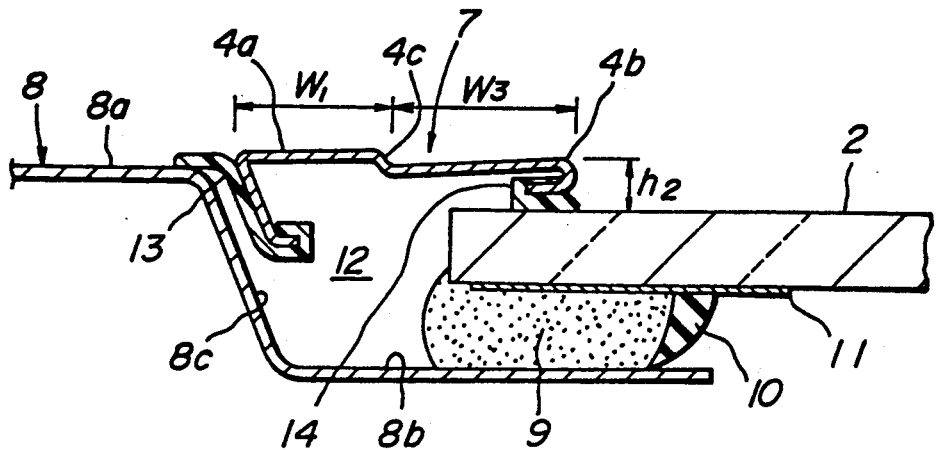
FIG._5
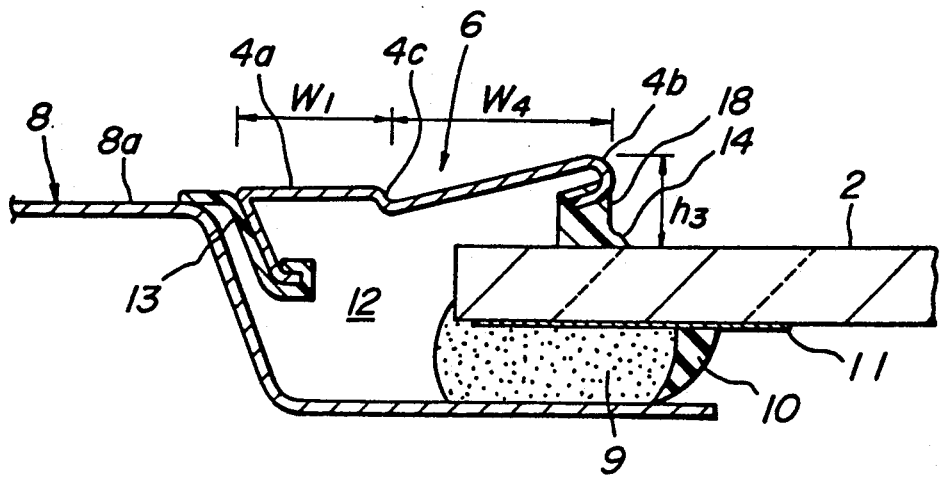

FIG_8
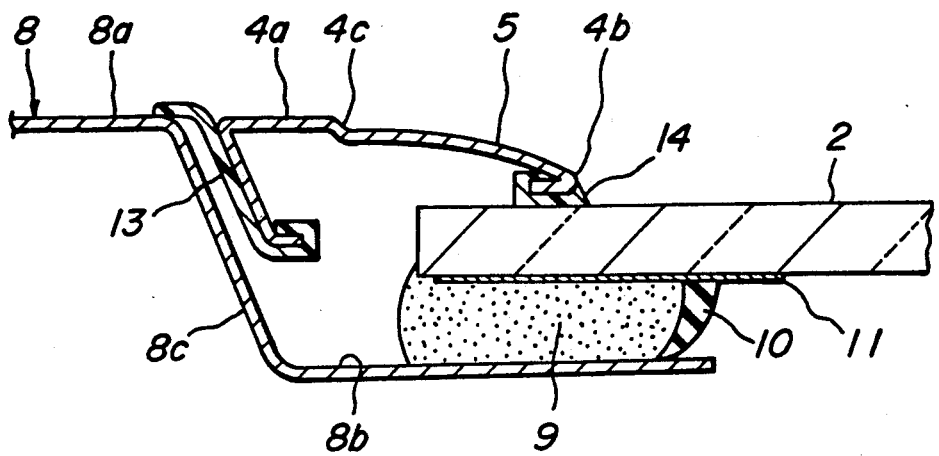
FIG_9
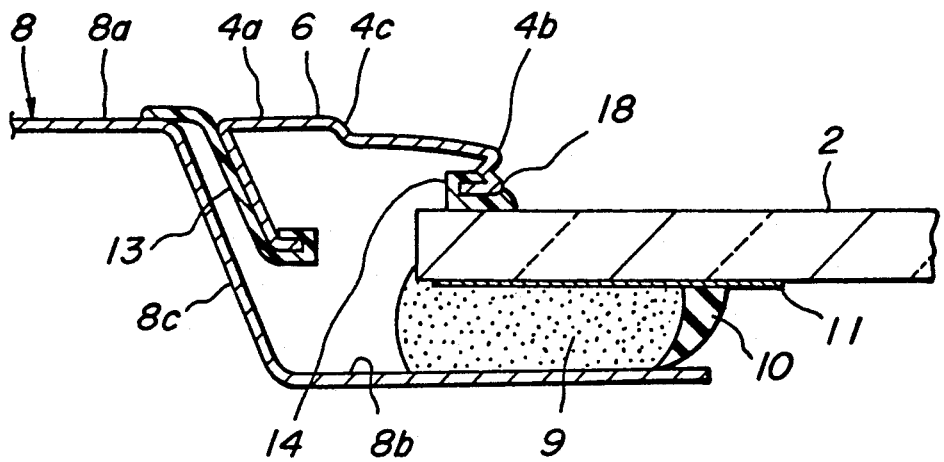

WINDOW MOLDING MEMBER FOR AUTOMOBILES

BACKGROUND OF THE INVENTION

1. Field of the Invention

The present invention relates to a window molding member for automobiles, with a cross section which varies in its longitudinal direction.

2. Description of the Related Art

Typically, window molding members are used in combination with automobiles including a body panel with an outer surface, a flange recessed from the outer surface, and a shoulder portion connecting the flange with the outer surface. The flange of the body panel serves to mount a window plate thereon, with the peripheral edge of the window plate opposed to the shoulder portion of the body panel to leave a gap therebetween.

A number of kinds of window molding members adapted to satisfy various functional and/or ornamental requirements are known and widely used for automobiles. Among others, Japanese Utility Model Application Publication No. 57-54,416 discloses a molding member including an upper segment to extend along the upper edge of the window plate, a pair of side segments to extend along the side edges of the window plate, and a pair of corner connection pieces connecting the upper and side segments with each other. The upper and side segments each has a main body adapted to cover the gap between the automobile body panel and the window plate. The side segment is further provided with a ridge extending throughout the entire length of the side segment and projecting from the main body toward and above the window plate, such that a channel is formed between the ridge and the window plate. The channel serves to prevent rain water on the window plate from flowing across the side segment and neighboring body panel portion or pillar onto an adjacent side window, by guiding the water to flow along the channel without disturbing the driver's sight through the side window. The upper segment without the ridge, in turn, realizes a flush outer surface of the automobile body along the upper edge of the window plate. However, due to the difference in cross-sectional shape between the upper and side segments, they have to be prepared separately and then connected with each other using separate corner connection pieces.

To eliminate the above-mentioned drawbacks of the conventional arrangement, another type of window molding member is known from Japanese Patent Application Laid-open Publication No. 62-283,017, etc., which is formed of an extruded body of a synthetic resin material with an originally constant cross section throughout the entire length, and which has subsequently been subjected to a deformation such that the channel is formed along the side segment of the molding member. However, such an arrangement of the molding member does not allow the formation of a side segment whose width varies in the longitudinal direction, and may not always meet with the diversification of ornamental design requirements imposed on the molding members.

SUMMARY OF THE INVENTION

Consequently, it is an object of the present invention to provide a novel window molding member for automobiles, which allows the formation of a side segment with a longitudinally variable width, and which thus satisfies diverse ornamental design requirements.

According to the present invention, there is provided a window molding member for automobiles including a body panel having an outer surface, a flange which is recessed from said outer surface, and a shoulder portion connecting said flange with said outer surface, as well as a window plate mounted on said flange of the body panel. The window plate having a peripheral edge to be opposed to said shoulder portion of the body panel and leaving a gap therebetween. The molding member includes at least one upper segment to extend at least partly along an upper edge of the window plate, at least one side segment to extend along at least one side edge of the window plate, and at least one corner segment integrally and continuously connecting said upper and side segments with each other in the longitudinal direction of said molding member.

The molding member comprising a main body composed essentially of a sheet metal material and adapted to cover the gap, the main body including first and second sections which are integrally connected with each other and to be engaged with the outer surfaces of said body panel and said window plate, respectively and an elongate cushion element which is composed essentially of a resilient material integrally connected to said second section of the main body to extend along the entire length of the molding member. The cushion element is adapted to be brought into contact with said outer surface of the window plate, and the cushion element cooperates with said second section of the main body to form a weir along said side segment for preventing water on the window plate from flowing across said side segment and guiding the water to flow along said side segment.

With the above mentioned arrangement of the window molding member according to the present invention, the elongate cushion element which cooperates with the second section of the molding member main body may have a thickness along the side segment, which is greater than its thickness along the upper segment by such an amount as to form the weir which is adapted to preserve the driver's sight through the side windows. Moreover, the second section of the main body may have a longitudinally variable width which effectively meets with a diversification of the ornamental requirements of the molding members.

BRIEF DESCRIPTION OF THE DRAWINGS

FIG. 1 is a perspective view of an automobile with a window molding member according to the present invention;

FIG. 2 is a perspective view, in an enlarged scale, of one embodiment of the molding member mounted on the automobile body;

FIG. 3 is a cross-sectional view taken along the line III—III in FIG. 2, showing the upper segment of the molding member;

FIG. 4 is a cross-sectional view taken along the line IV—IV in FIG. 2, showing the corner segment of the molding member;

FIG. 5 is a cross-sectional view taken along the line V—V in FIG. 2, showing the side segment of the molding member;

FIGS. 8 and 9 are respectively cross-sectional views corresponding to FIGS. 3 and 5 and showing the upper and side segments of another embodiment of the molding member according to the present invention.

DETAILED DESCRIPTION OF THE PREFERRED EMBODIMENTS

Figure 6:
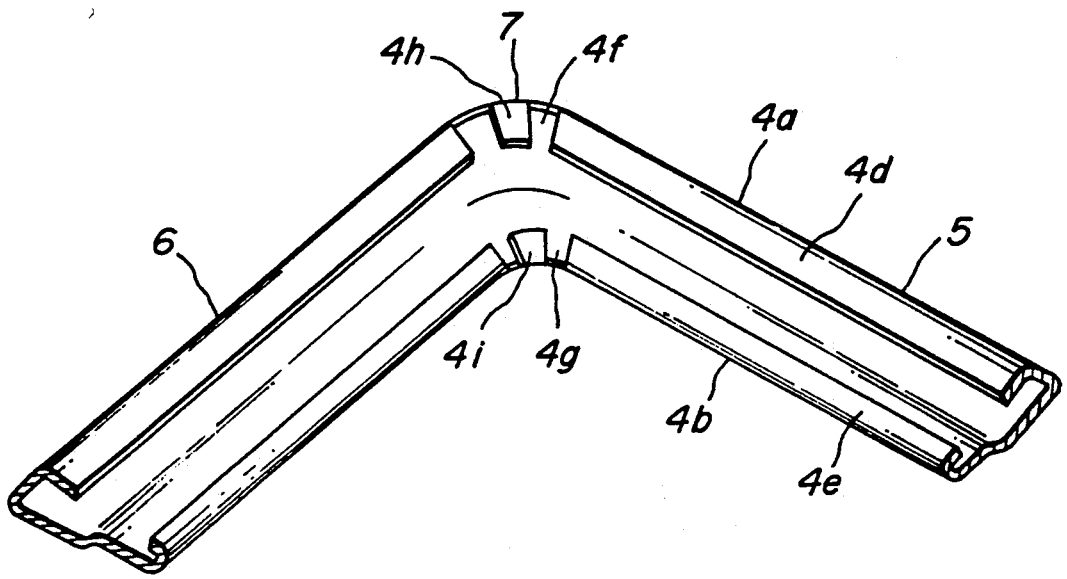
FIG. 6 is a perspective view showing the rear side of the molding member in the region of the corner segment.

The present invention will be more fully explained hereinafter, with reference to some preferred embodiments shown in the accompanying drawings.

There is shown in FIG. 1 an automobile with a body 1, a front window or window plate 2, side windows 3, as well as a windshield molding member 4 according to the present invention, which is to be arranged along the periphery of the window plate 2 and which, as more clearly shown in FIG. 2, includes a pair of upper segments 5 to extend along the upper edge of the window plate 2, a pair of side segments 6 to extend along the side edges of the window plate 2, and a pair of corner segments 7 continuously connecting the upper and side segments 5, 6 into an integral component.

The automobile body 1 includes a body panel 8 with an outer surface 8a, a flange 8b recessed from the outer surface 8a, and a shoulder portion 8c connecting the flange 8b with the outer surface 8a. The flange 8b of the body panel 8 serves to mount the window plate 2 with an adhesive material 9 and a dam rubber 10 which are covered by an opaque printed layer 11 on the rear peripheral surface of the window plate 2. The window plate 2 is mounted on the flange 8b such that the edge of the plate 2 is spaced from the shoulder portion 8c with a gap 12 therebetween. The window plate 2 may be composed of an inorganic glass or appropriate synthetic resin material with transparency, such as polycarbonate or acrylic resin.

The molding member 4 includes a main body which is adapted to cover the gap 12 between the edge of the window plate 2 and the shoulder portion 8c of the body panel 8. The main body is composed of an appropriate sheet metal material like a stainless steel shaped into a desired configuration by a stamping operation, and comprises a first section 4a engageable with the outer surface 8a of the body panel, a second section 4b which, in turn, is engageable with the outer surface of the window plate 2, and a shoulder portion 4c connecting the first and second sections 4a, 4b with each other. The first section 4a has a width $W_1$ which may be constant throughout the entire length of the molding member 4. The second section 4b has a width which is variable in the longitudinal direction of the molding member 4. More particularly, the second section 4a may have a width $W_2$ along the upper segment 5, a width $W_3$ along the corner segment 7 which is greater than the width $W_2$, and a width $W_4$ along the side segment 6 which is greater than the width $W_3$ ($W_2 < W_3 < W_4$). If desired, the width $W_4$ of the second section 4b may be made to continuously increase toward the lower end of the side segment 6, as seen in FIG. 1. The main body further comprises webs 4d, 4e which, as shown in FIG. 6, are arranged on the rear sides of the first and second sections 4a, 4b, respectively. These webs 4d, 4e are each formed in the corner regions corresponding to the corner segments 7 with a pair of cutouts 4f, 4g for facilitating the axial bending of the sheet metal material along the corner segments 7, and with a tongue 4h, 4i between the cutouts 4f, 4g of each pair for engaging appropriate mounting clips, if necessary.

The molding member 4 further includes first and second elongate cushion elements 13, 14 extending along the entire length of the molding member 4, both composed essentially of a resilient synthetic resin material like a soft PVC resin, or of other appropriate elastomeric material like a butyl rubber. The first cushion element 13 has a constant thickness throughout the entire length of the molding member 4, and is integrally connected to the first section 4a of the main body and adapted to be brought into contact with the outer surface 8a of the body panel 8. The second cushion element 14 has a thickness along the side segment 6 which is greater than its thickness along the upper segment 5, and is integrally connected to the second section 4b of the main body and adapted to be brought into contact with the outer surface of the window plate 2. As will be explained below, the second cushion element 14 functions as a spacer between the second section 4b of the main body and the window plate 2. These cushion elements 13, 14 may be molded integrally with the sheet metal material for the molding member main body, e.g. by an insert injection molding process in which the sheet metal material of a desired configuration is placed in an injection mold, and the material forming the spacer elements 13, 14 is then injected into the mold cavity.

Figure 7:
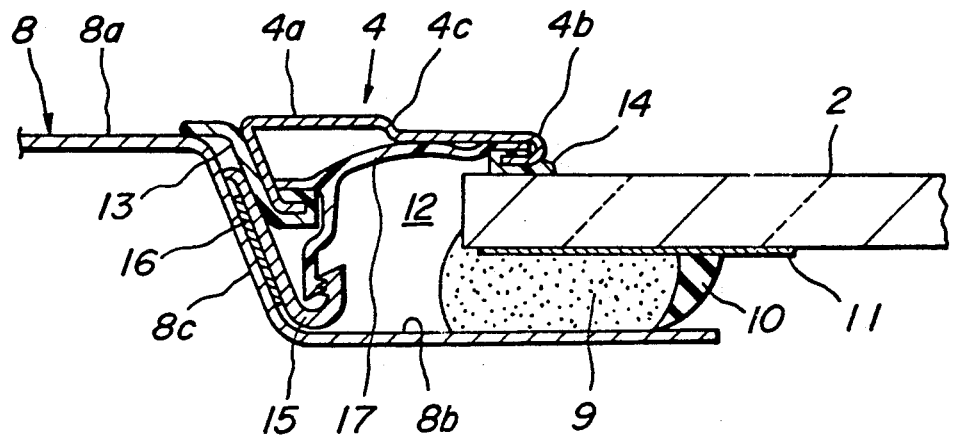
FIG. 7 is a cross-sectional view corresponding to FIG. 3, showing the molding member together with a fastener and clips for securing the molding member on the body panel.

The molding member 4 of the above-mentioned structure may be mounted in place using fastener and clips which have been omitted in FIGS. 2 to 5 for the sake of clarity. As particularly shown in FIG. 7, the fastener 15 is secured to the body panel 8 throughout the entire length of the shoulder portion 8c by a viscous tape or the like adhesive means 16. The fastener 15 is preferably formed of a synthetic resin, such as polyamide resin, to have a sufficient rigidity. On the other hand, flexible clips 17 engageable with the fastener 15 are inserted into the space in the main body on its rear side between the webs 4d, 4e, at locations spaced longitudinally from each other. The clips 17 are preferably formed of a synthetic resin, such as polyacetal or polyamide resin, to have a sufficient flexibility.

When the molding member 4 is mounted in place by engaging the flexible clips 17 with the fastener 15, the first cushion element 13 forms a lip in contact with the outer surface 8a of the body panel 8 throughout the entire length of the molding member 4. The second cushion element 14 is in contact with the outer surface of the window plate 2 throughout the entire periphery of the window plate 2. Because the cushion element 14 has a longitudinally variable thickness as mentioned above, the free end of the second section 4b of the molding member main body is arranged close to the outer surface of the window plate 2 along the upper segment 5, as shown in FIG. 3, while it is somewhat spaced therefrom along the side segment 6, as shown in FIG. 5. This is illustrated in FIGS. 3 to 5 in terms of the height $h_1$, $h_2$ and $h_3$ ($h_1 < h_2 < h_3$) with which the second section 4b is spaced from the window plate 2. Thus, a lower profile of the cushion element 14 along the upper segment 5 serves to realize a flush outer surface of the automobile body 1 along the upper edge of the window plate 2, while the cushion element 14 along each side segment 6 functions as a spacer to form a weir 18 for preventing rain water on the window plate 2 from flowing onto the side window 3 across the side segment 6 and the neighboring pillar of the automobile body 1, by guiding the water to flow along the side segment 6 without disturbing the driver's sight through the side windows 3.

When, as in the illustrated embodiment, the width of the first section 4a is made constant throughout the entire length of the molding member 4 with the width or configuration of the second section 4b varied in the longitudinal direction, it is readily possible to realize an excellent appearance in that the upper and side segments are connected with each other in a continuous manner without requiring separate corner connection pieces therebetween. The second section of the main body along the upper segment assumes a predetermined orientation relative to the first section, and the second section of the main body along the second segment assumes another predetermined orientation relative to the first section. The window molding member 4 with a longitudinally variable cross-section can be manufactured relatively easily, and is capable of meeting with the diversification of ornamental design requirements.

Another embodiment of the present invention is shown in FIGS. 8 and 9, wherein the second section 4b of the molding member main body has an extension along the side segment 6, which projects toward the outer surface of the window plate 2 and cooperates with the cushion element 14 of a constant thickness to form the weir 18.

It will be readily appreciated from the foregoing description that, according to the present invention, the molding member main body includes the second section with a longitudinally variable width which cooperates with a cushion element with a longitudinally variable thickness to define a weir along the side segment of the molding member for preserving the driver's sight through the side window and to satisfy various ornamental design requirements.

It has to be noted that the present invention is not limited to the above-mentioned illustrated embodiments which have been presented by way of examples only, and a number of variations and/or modifications are possible without departing from the scope of the invention.

For example, although the molding member has been illustrated in FIG. 1 as being divided into two halves, one on the left side and the other on the right side, whose upper segments are connected with each other at the center of the upper edge of the window plate, this is not a prerequisite condition. Thus, the molding member may include two halves each comprising a relatively short upper segment adjacent to the corner segment, which is to be connected with the corresponding upper segment of the opposite half by a relatively long upper connection segment. Alternatively, the molding member may include a single upper segment and each one pair of side and corner segments which are formed into an integral one-piece body.

Furthermore, the cushion elements may be previously formed either by injection or extrusion molding process separately from the main body, and may then be secured to the main body.

What is claimed is:

1. A window molding member for automobiles including a body panel having an outer surface, a flange which is recessed from said outer surface, and a shoulder portion connecting said flange with said outer surface, and a window plate mounted on said flange of the body panel, said window plate having a peripheral edge opposing said shoulder portion of the body panel leaving a gap therebetween, said molding member comprising at least one upper segment to extend at least partly along an upper edge of the window plate, at least one side segment to extend along at least one side edge of the window plate, at least one corner segment integrally and continuously connecting said upper and side segments with each other in a longitudinal direction of said molding member, a main body comprising a sheet material and adapted to cover said gap, said main body including first and second sections which are integrally connected with each other and to be engaged with the outer surfaces of said body panel and said window plate, respectively, said second section having a width which varies in the longitudinal direction of said molding member, and an elongate cushion element comprising a resilient material integrally connected to said second section of the main body to extend along an entire length of the molding member such that the cushion element contacts said outer surface of the window plate, said cushion element cooperating with said second section of the main body to form a weir along said side segment for preventing water on the window plate from flowing across said side segment and guiding the water to flow along said side segment.

2. The window molding member as claimed in claim 1, wherein said first and second sections of the main body are integrally connected with each other through a shoulder section.

3. The window molding member as claimed in claim 1, wherein said second section of the main body has a predetermined width along said upper segment and another predetermined width along said side segment.

4. A window molding member for automobiles including a body panel having an outer surface, a flange which is recessed from said outer surface, and a shoulder portion connecting said flange with said outer surface, and a window plate mounted on said flange of the body panel, said window plate having a peripheral edge opposing said shoulder portion of the body panel leaving a gap therebetween, said molding member comprising at least one upper segment to extend at least partly along an upper edge of the window plate, at least one side segment to extend along at least one side edge of the window plate, at least one corner segment integrally and continuously connecting said upper and side segments with each other in a longitudinal direction of said molding member, a main body comprising a sheet material and adapted to cover said gap, said main body including first and second sections which are integrally connected with each other and to be engaged with the outer surfaces of said body panel and said window plate, respectively, and an elongate cushion element comprising a resilient material integrally connected to said second section of the main body to extend along an entire length of the molding member such that the cushion element contacts said outer surface of the window plate, said cushion element cooperating with said second section of the main body to form a weir along said side segment for preventing water on the window plate from flowing across said side segment and guiding the water to flow along said side segment, wherein said cushion element has a first thickness along said upper segment and a second thickness along said side segment which is greater than said first thickness by such an amount as to form said weir.

5. A window molding member for automobiles including a body panel having an outer surface, a flange which is recessed from said outer surface, and a shoulder portion connecting said flange with said outer surface, and a window plate mounted on said flange of the body panel, said window plate having a peripheral edge opposing said shoulder portion of the body panel leaving a gap therebetween, said molding member comprising at least one upper segment to extend at least partly along an upper edge of the window plate, at least one side segment to extend along at least one side edge of the window plate, at least one corner segment integrally and continuously connecting said upper and side segments with each other in a longitudinal direction of said molding member, a main body comprising a sheet material and adapted to cover said gap, said main body including first and second sections which are integrally connected with each other and to be engaged with the outer surfaces of said body panel and said window plate, respectively, wherein said second section of the main body along said upper segment assumes a predetermined orientation relative to said first section, and said second section of the main body along said side segment assumes another predetermined orientation relative to said first section, and an elongate cushion element comprising a resilient material integrally connected to said second section of the main body to extend along an entire length of the molding member such that the cushion element contacts said outer surface of the window plate, said cushion element cooperating with said second section of the main body to form a weir along said side segment for preventing water on the window plate from flowing across said side segment and guiding the water to flow along said side segment.

* * * * *